Aug. 16, 1960  J. A. RANSOHOFF ET AL  2,949,414
SELF-REGULATING BOILING-WATER NUCLEAR REACTORS
Filed Nov. 18, 1958  2 Sheets-Sheet 1

INVENTORS
Jackson A. Ransohoff
John D. Plauchar
BY
Roland A. Anderson
Attorney

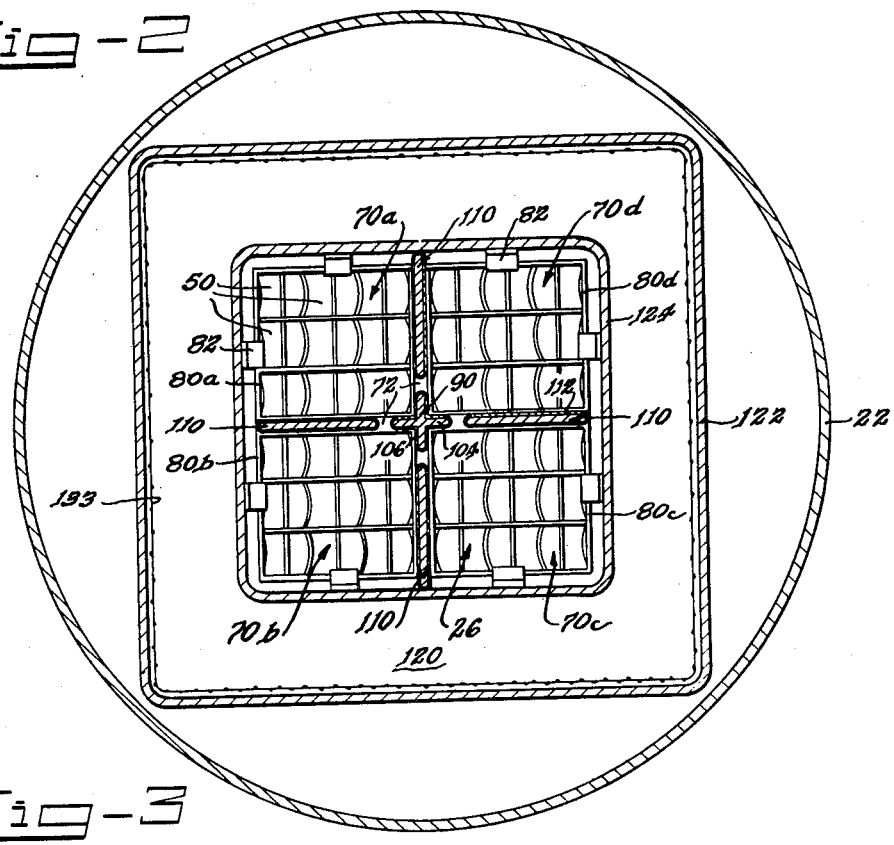
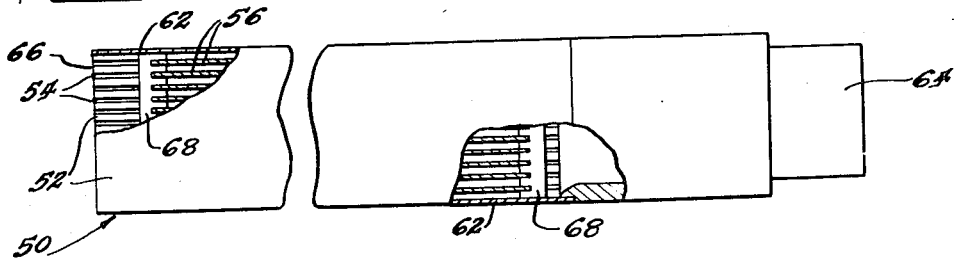
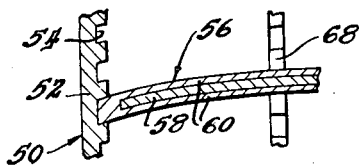

United States Patent Office 2,949,414
Patented Aug. 16, 1960

---

2,949,414

SELF-REGULATING BOILING-WATER NUCLEAR REACTORS

Jackson A. Ransohoff, Washington, D.C., and John D. Plawchan, San Rafael, Calif., assignors to the United States of America as represented by the United States Atomic Energy Commission Filed Nov. 18, 1958, Ser. No. 774,794

5 Claims. (Cl. 204—154.2)

The present invention relates to nuclear reactors, and more particularly to self-regulating boiling-water nuclear reactors.

A boiling-water reactor is one in which fissioning of a nuclear fuel produces heat which boils water contained within the core of the reactor. The steam formed thereby may be conveyed to a turbogenerator to generate electricity.

The terms "water" and "steam" as used throughout the specification and claims will be understood to include both hydrogen oxide ($H_2O$) and deuterium oxide ($D_2O$).

In a boiling-water reactor the reactor core is disposed within a sealed pressure vessel, so that the steam formation develops pressure within the pressure vessel. The magnitude of the pressure within the pressure vessel is determined by the reactivity of the reactor and by the amount of steam withdrawn from the pressure vessel. If the demand for steam decreases, the pressure in the pressure vessel will increase and if the demand increases, the pressure will decrease.

A change in the steam pressure within the pressure vessel produces two competing effects or reactivity. First, the temperature changes as the pressure changes—an increase in pressure increasing the temperature and thereby tending to decrease the reactivity of the reactor. Second, the size of bubbles in the water changes as the pressure changes—an increase in pressure reducing the size of the bubbles and thereby tending to increase the reactivity of the reactor. Which of these two effects will predominate is determined by the void fraction within the reactor core. By void fraction is meant the ratio of the volume of the space occupied by steam bubbles in the water to the total volume of water plus bubbles.

If the void fraction is sufficiently large, the second effect will predominate, that is, the reactivity of the reactor increases with increasing pressure because the effect of decreasing bubble size exceeds the effect of increasing temperature. Obviously, therefore, a boiling-water reactor operated under such conditions is not self-regulating because increased pressure causes increased reactivity which causes increased pressure and so on.

At low power levels, where the void fraction is low, the effect of change in temperature may predominate and the reactor will to some extent be self-regulating. However, as reactor power declines, the void fraction decreases thereby tending to increase reactor power and reinstating the unbalance. Although reactor power would gradually decrease toward the new demand level, and might even reach it, temperature and pressure would have to rise unreasonably to provide the necessary decrease in reactivity for all but insignificant changes in demand. As a result boiling-water reactors which are employed for the production of power generally require some means for regulating the power level of the reactor in response to the load demand.

One way of correlating the power level of the reactor with the load demand is to dump excess steam from the reactor directly into the condenser in the event of a decrease in the power demand. This method of correlation is disclosed in the patent application by Samuel Untermyer entitled "Device and Method for Producing Power," Serial No. 518,427, filed June 28, 1955, now Patent No. 2,936,273 issued May 10, 1960. The patent application of Michael Treshow entitled "Neutronic Reactor," Serial No. 595,031, filed June 29, 1956, now Patent No. 2,873,242, issued February 10, 1959, discloses a device for correlating the reactivity of the reactor and the quantity of steam which is bypassed from the reactor to the condenser in order to reduce the amount of steam wasted.

It is one of the objects of the present invention to provide a boiling-water reactor in which the reactivity of the reactor is automatically correlated with the steam demand.

It is a further object of this invention to provide a boiling-water reactor in which the reactivity is correlated to the demand for steam without wasting steam.

These objects and other objects of the invention will be more fully appreciated from a further reading of this disclosure, particularly when viewed in the light of the drawings, in which:

Figure 2 is a sectional view taken along the line 2—2 of Figure 1;

Figure 3 is an elevational view, partly cut away and in section, of a fuel element of the reactor illustrated in Figures 1 and 2; and Figure 4 is a fragmentary view of one of the fuel elements of the reactor.

Figure 1:
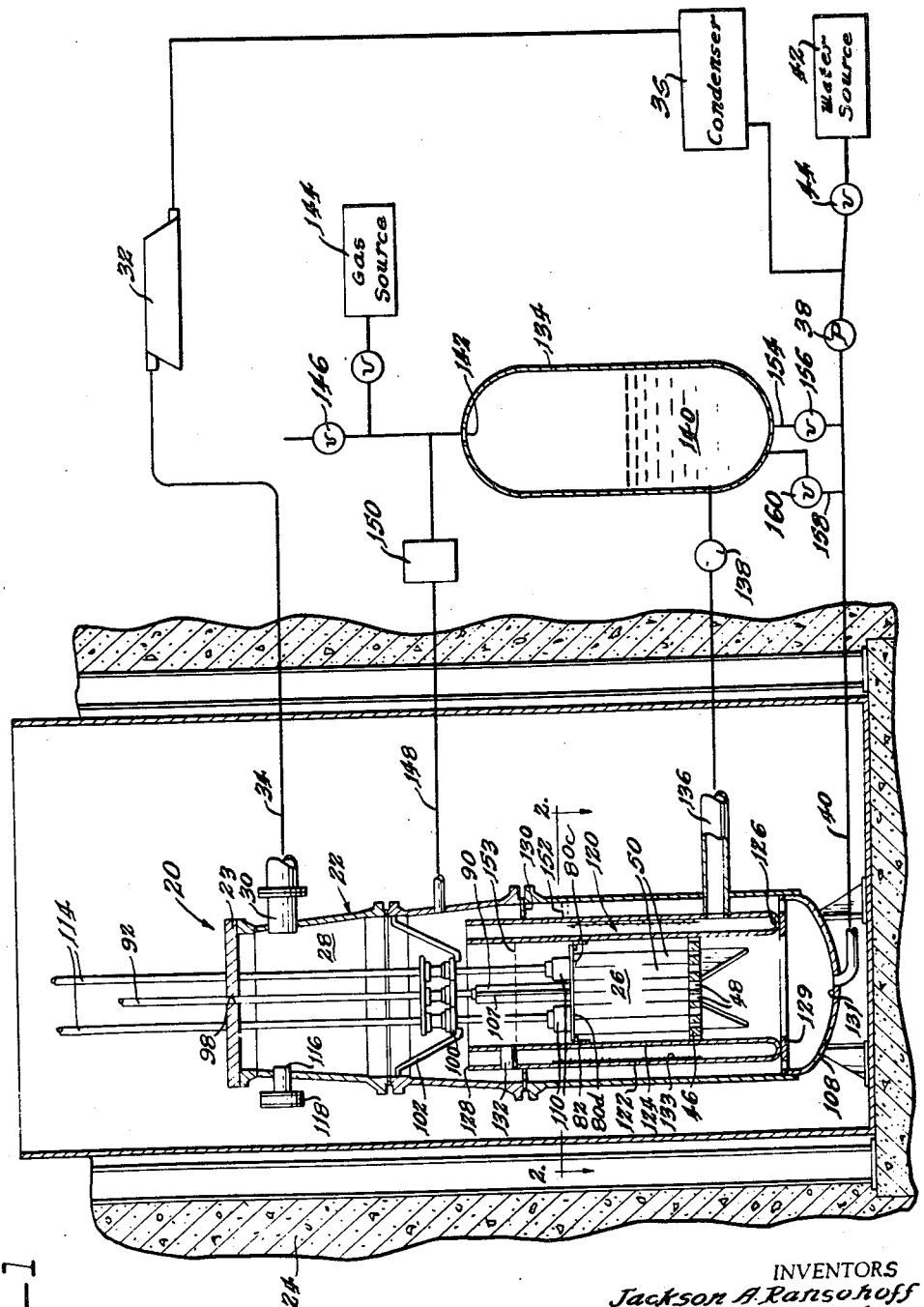
Figure 1 is a schematic diagram of a boiling-water reactor system constructed according to the teachings of the present invention, the reactor being shown in vertical section.

As illustrated in Figure 1, the reactor system includes a nuclear reactor 20 which includes a pressure vessel 22, having a cover 23, all enclosed within a radiation shield 24. The pressure vessel 22 contains a core 26 in a lower portion thereof, and the upper portion, designated 28, of the pressure vessel is employed as a steam chamber. The upper portion 28 of the pressure vessel 22 has a port 30 which is connected to a turbine 32 by supply line 34. The exhaust steam from the turbine 32 is condensed in a condenser 36, and the condensate from the condenser is returned to pressure vessel 22 by means of pump 38 through feed water line 40 connected to the bottom of the pressure vessel 22. Additional water is also pumped into the pressure vessel, as required, from a source 42 connected through a valve 44 to the inlet side of the pump 38.

The reactor core 26 is disposed in the lower portion of the pressure vessel 22 and rests upon a support plate 46. The support plate 46 is provided with a plurality of spaced apertures 48 for accommodating fuel elements 50. As illustrated in Figures 3 and 4, each of the fuel elements 50 contains end plates 52 which are disposed parallel to each other and provided with a plurality of slots 54 on confronting surfaces. A curved fuel plate 56 is disposed between each pair of confronting slots, and has a core 58 which contains material fissionable by neutrons of thermal energy. The fuel plates 56 also have a protective jacket 60 which surrounds the core 58 thereof. The fuel elements also have curved side plates 62, and the side plates 62 and end plates 52 form closed channels. The fuel elements 50 are provided with a sleeve-shaped mounting nozzle 64 at one end which is adapted to fit slidably within one of the apertures 48 of the support plate 46; in this particular construction, the nozzles 64 and the apertures 48 have square contours. The other end 66 of the fuel elements 50 is open to permit the flow of steam and water therefrom.

The fuel plates are slightly curved, and supporting comb-shaped ribs 68 extend between the side plates 62 normal to the fuel plates 56 gripping each of the fuel plates 56.

In the particular construction described, the end plates 52 and side plates 62 are constructed of 2-S aluminum, the end plates having a thickness of 0.188 inch, a width of 3.186 inches and a length of 24.625 inches. The side plates 62 have a thickness of 0.060 inch and length of 24.625 inches. The end plates 52 are separated by a distance of 2.620 inches. The core 58 of each of the fuel plates 56 has a length of 23.625 inches, has a width of 2.5 inches, and a thickness of 0.021 inch. The jackets 60 are a layer of aluminum 0.0205-inch thick. The fuel plates 56 are curved on a radius of 30 inches and contain 13.3 percent uranium and 86.7 percent aluminum, the uranium containing 93.5 percent U-235 by weight, and the total U-235 content per plate being 7.70 grams. The aluminum disposed in the fuel plates 56 is 99.75 percent pure. There are 18 fuel plates 56 in each fuel element 50, this providing 138.60 grams of U-235 to each fuel element 50.

The reactor core 26 is adapted to accommodate up to 36 fuel elements 50 disposed in four quadrants 70a, 70b, 70c, and 70d, the fuel elements 50 in each quadrant being in contact with the adjacent fuel elements 50. The four quadrants are formed by an X-shaped channel 72 with an axis coinciding with the axis of the pressure vessel 22 and a width of one inch. The fuel elements 52 are held in place by four grids 80a, 80b, 80c, and 80d, located, respectively, in quadrants 70a, 70b, 70c, and 70d. Grids 80a, 80b, 80c, and 80d are secured by clamps 82.

An X-shaped control rod 90 is translatably disposed at the center of the four quadrants in the channel 72. An extension shaft 92 is connected to the X-shaped control rod 90 and extends through the cover 23 to a control rod drive mechanism (not illustrated). A guide plate 100 is disposed within the pressure vessel 22 and provided with an aperture through which the shaft 92 is journaled, and is mounted upon brackets 102 secured to the pressure vessel 22. The control rod 90 is shaped in the form of an X, and is formed by four cadmium sheets 104 approximately ¼ inch thick which extend outwardly from the axis of the rod. These cadmium sheets 104 are approximately 3½ inches wide each, making the control rod 90 a total of approximately 7 inches across. The sheets 104 are encased in aluminum cladding 106, and the aluminum cladding extends upwardly from the upper end of the cadmium sheets 104 for a distance approximately equal to the length of the cadmium sheets, forming an extension 107 of material having a small neutron capture cross section, and it is there anchored to the shaft 92.

The length of the cadmium sheets 104 is approximately 24 inches.

The support plate 46 is disposed above the semi-cylindrical bottom 108 of the pressure vessel 22 by a distance greater than the height of the core, namely, approximately 28 inches, so that the control rod 90 may be lowered to position the cadmium sheets 104 below the core 26 of the reactor, and thus increase the reactivity of the active portion of the reactor by positioning the aluminum extension 107 of the rod 90 in the active portion of the reactor.

In addition to the control rod 90, there are four cadmium control plates 110 which are disposed between the four quadrants 70a, 70b, 70c, and 70d. These plates 110 are also provided with jackets 112 of aluminum and are approximately 7 inches wide and 24 inches long. The plates 110 are connected to shafts 114 which are in turn connected to drive mechanisms not illustrated, or which may be manually actuated.

The pressure vessel 22 is provided with an aperture 116 adjacent to the cover 23 thereof, and this aperture 116 is sealed by a disc 118 which will rupture if a pressure greater than 700 pounds occurs within the pressure vessel 22.

A rectangular reflector tank 120 is disposed within the pressure vessel 22 and surrounds the core 26 of the reactor 20. The tank 120 has an outer wall 122 and an inner wall 124 spaced from the outer wall and disposed around the core 26 of the reactor. A curved bottom 126 seals the inner wall to the outer wall of the tank 120, and the tank 120 is open at its upper end 128. Tank 120 rests on support plate 129 which is located 10 inches above the lowest point 131 of the cylindrical bottom 108 of the pressure vessel 22. Tank 120 is fixed in place by brackets 130. Overflow pipes 132 extend entirely through the reflector tank 120 near the upper end thereof to connect the part of the pressure vessel outside the tank 120 with the part immediately above core 26. Pipes 132 are 4 inches in diameter and are located 6 inches below the top of reflector tank 120. These pipes 132 are provided so that the coolant can circulate within the pressure vessel and to ensure against overflow into the reflector tank. Screens 133 of boron steel may be provided on the outer wall 122 of reflector tank 120 to increase reflector worth. Annular reflector tank 120 is constructed of zirconium .125 inch thick. Its outer wall 122 is 3 feet 6 inches square and its inner wall 124 is 2 feet 6 inches square. Reflector tank 120 is 5 feet in height. Pressure vessel 22 is constructed of stainless steel and has a diameter of 4 feet 6 inches and a height of 8 feet 6 inches. The reactor is designed to produce steam under a pressure of 300 p.s.i.a. at a temperature of 417° F.

Reflector tank 120 is connected to a surge tank 134 by a 2-inch pipe 136 which contains a flow-restricting orifice 138. The surge tank 134 contains a body 140 of water and the tank 120 also contains a portion of this body of water. Surge tank 134 is 3 feet 6 inches in diameter and is 8 feet high. The surge tank 134 is provided with an aperture 142 at its top which is connected to a pressurized source of inert gas 144, such as helium. The aperture 142 is also connected to a valve 146 which may be used to reduce the pressure within the surge tank 134 to atmospheric pressure. Also, the aperture 142 is connected to the pressure vessel 22 of the reactor 20 by a pipe 148 which contains a rupture disc 150.

To operate the reactor, pressure vessel 22 is filled with water from source 42 to the level 152 indicated in Figure 1, this level being just above the grid 80 of the reactor. It will be appreciated that in operation boiling within the core produces steam and the flow of steam upwardly through the core results in a circulation of water up through the core and a higher water level, denoted by 153, directly above the core than in the outer portion of the pressure vessel. Therefore the water overflows through overflow ports 132 and down past the core in the outer portion of the pressure vessel 22.

Surge tank 134 is filled with water by means of fill line 154, controlled by valve 156, and is drained through drain line 158, controlled by valve 160.

The water level in reflector tank 120 is established for a given pressure within the pressure vessel 22 by the pressure within surge tank 134. This pressure is established by introducing gas thereinto from gas source 144. If necessary, the pressure may be reduced by valve 146. Shim control of the reactor may be had by varying the gas pressure within surge tank 134. That is, as the reactor operates over an extended period of time and loses reactivity the pressure in surge tank 134 can be increased to force more water into reflector tank 120. This increases the reactivity of the reactor.

The operation of the novel control system to regulate steam producton in response to demand will next be described. When the reactor is producing steam at a rate equal to demand, the heght of the reflector remans constant. A decrease in demand results in a gradual increase in steam pressure. As the pressure rises water is forced out of the reflector tank into the surge tank. The reflector level falls, causing the reactivity to decrease and the power to drop. As the steam generation rate decreases, so does the void fraction, thereby lessening the effect of reflector removal and providing a certain amount of damping. Also the rising liquid level in the surge tank as liquid is transferred from the reflector tank compresses the gas, decreasing somewhat the difference in pressure between the two vessels. Eventually the steam production will equal consumption, and the pressure in the reactor vessel will stop rising. The reflector will continue to drop, however, until the surge tank pressure balances the reactor tank pressure.

When the two pressures are in balance, the reactor is on a negative period, however, and at a power level somewhat below demand. The reactor pressure will continue to fall, and liquid will then be returned to the reflector due to the excess pressure in the surge tank. The process then repeats itself in the direction of increasing power now and the reflector oscillates up and down until equilibrium power at a new reflector level is attained. For an increase in steam consumption when the reactor is in equilibrium, the process described above would be reversed. The reactivity change obtained by a change in the reflector level from the top to the bottom of the core is about 5%. Changes in sensitivity of the control system can be obtained by changing the size of the surge tank 134 and the amount of water contained therein.

Orifice 138 in the connecting pipe 136 is designed to minimize the amplitude and duration of the oscillations in reactor power level which occur due to change in load. For safety it permits unrestricted flow from the reflector tank 120 to the surge tank 134 but restricts the flow in the reverse direction.

It will be understood that this invention is not to be limited to the details given herein, but that it may be modified within the scope of the appended claims.

What is claimed is:

1. A self-regulating demand-responsive boiling-water nuclear reactor comprising a pressure vessel containing a mass of water, a reactor core containing material fissionable by neutrons of thermal energy mounted within the pressure vessel and submerged within the water, a source of water connected to the bottom of the pressure vessel, a steam line connecting the top of the pressure vessel to a demand system for the steam, said nuclear reactor being operated under conditions such that the mass of water boils in the pressure vessel, an annular reflector tank located within the pressure vessel and disposed about the reactor core, said reflector tank being open at the top to the interior of the pressure vessel, a source of pressurized gas connected to the upper portion of the surge tank, a surge tank located outside the pressure vessel, and a pipe connecting the reflector tank with the surge tank, said surge tank and reflector tank containing a mass of water, whereby changes in the demand for steam change the steam pressure in the pressure vessel and thereby change the height of water in the reflector tank.

2. A nuclear reactor according to claim 1 wherein the reflector tank has overflow pipes extending therethrough located adjacent the top thereof connecting the part of the pressure vessel inside the reflector tank with the part of the pressure vessel outside the reflector tank.

3. A nuclear reactor according to claim 2 wherein a screen of material having a high neutron capture cross section is disposed adjacent to the outer wall of the reflector tank to increase reflector worth.

4. A nuclear reactor according to claim 3 wherein the upper portion of the pressure vessel and the upper portion of the surge tank are connected by a line having a rupture disc therein.

5. A system for producing power comprising a pressure vessel containing a mass of water, a reactor core containing vertically disposed plates including a material fissionable by neutrons of thermal energy mounted within the pressure vessel and submerged within the water, a steam line connecting the top of the pressure vessel to a turbine, a condenser connected to the turbine, a pump having an inlet end connected to the condenser and an outlet end connected to the bottom of the pressure vessel, said reactor being operated under conditions such that the mass of water in the pressure vessel boils, and means for controlling the reactivity of the reactor in response to demand for steam by the turbine comprising an annular reflector tank located within the pressure vessel and disposed about the reactor core, said reflector tank being open near the top to the interior of the pressure vessel, a surge tank located outside the pressure vessel, a pipe connecting the reflector tank with the surge tank, said surge tank and reflector tank containing a mass of water, and a source of pressurized gas connected to the upper portion of the surge tank.

References Cited in the file of this patent

UNITED STATES PATENTS 2,816,068    Ruano _____ Dec. 10, 1957

OTHER REFERENCES

Iskendirian et al. and Simpson et al.: "International Conference on the Peaceful Uses of Atomic Energy," vol. 3, pages 157–168 and 211–242, August 1955, U.N. Publication, N.Y.

Nucleonics I, April 1956, pages 106–109.

Nucleonics II, July 1956, pages 42–45.

Reactors, Progress in Nuclear Energy, vol. 2, page 46 (1956), Permagon Press.

AECU–3427, "Preliminary Investigations for an Advanced Engineering Test Reactor," Feb. 22, 1957, pages 6, 7, Fig. 2F and Fig. 2G.

AECL–557, "Canadian Study for a Full Scale Nuclear Power Plant," January 1958, pages 30, 31.